United States Patent
Tan et al.

(10) Patent No.: US 8,382,303 B2
(45) Date of Patent: Feb. 26, 2013

(54) KEYPAD MODULE FOR PORTABLE ELECTRONIC DEVICE

(75) Inventors: Zheng-Ping Tan, Shenzhen (CN); Kuan-Hung Chen, Shindian (TW); Yao Wang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 231 days.

(21) Appl. No.: 13/036,105

(22) Filed: Feb. 28, 2011

(65) Prior Publication Data
US 2012/0043192 A1     Feb. 23, 2012

(30) Foreign Application Priority Data
Aug. 18, 2010   (CN) .......................... 2010 1 0256610

(51) Int. Cl.
*H04M 1/22*     (2006.01)

(52) U.S. Cl. ...................................... 362/23.03; 362/602
(58) Field of Classification Search .................... 362/23, 362/24, 26, 602
See application file for complete search history.

(56) References Cited

U.S. PATENT DOCUMENTS

| | | | | |
|---|---|---|---|---|
| 5,053,928 A | * | 10/1991 | Pasco | 362/24 |
| 5,083,240 A | * | 1/1992 | Pasco | 362/26 |
| 2007/0217181 A1 | * | 9/2007 | Chiu et al. | 362/26 |
| 2008/0007964 A1 | * | 1/2008 | Lin | 362/602 |

\* cited by examiner

*Primary Examiner* — David V Bruce
(74) *Attorney, Agent, or Firm* — Altis Law Group, Inc.

(57) ABSTRACT

A keypad module includes a light source, a light guide plate and a keypad. The light guide plate includes a plurality of coarse surfaces. The keypad forms a plurality of ribs corresponding to the coarse surfaces. The light source is positioned in the light guide plate, the coarse surfaces and the ribs guiding light of the light source to uniform on the light guide plate.

10 Claims, 4 Drawing Sheets

KEYPAD MODULE FOR PORTABLE ELECTRONIC DEVICE

BACKGROUND

1. Technical Field

The present disclosure relates to keypad modules and, particularly, to a keypad module for portable electronic devices.

2. Description of Related Art

In a portable electronic device, a typical keypad needs a light guide plate and a light source for illuminating the keypad. However, the brightness of the illumination decreases with increased distance from the light source. Thus, the typical keypad may need more multiple light sources to create a usable brightness. Accordingly, costs are greatly increased.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present keypad module. Moreover, in the drawings, like reference numerals designate corresponding parts throughout the several views.

DETAILED DESCRIPTION

Figure 1:
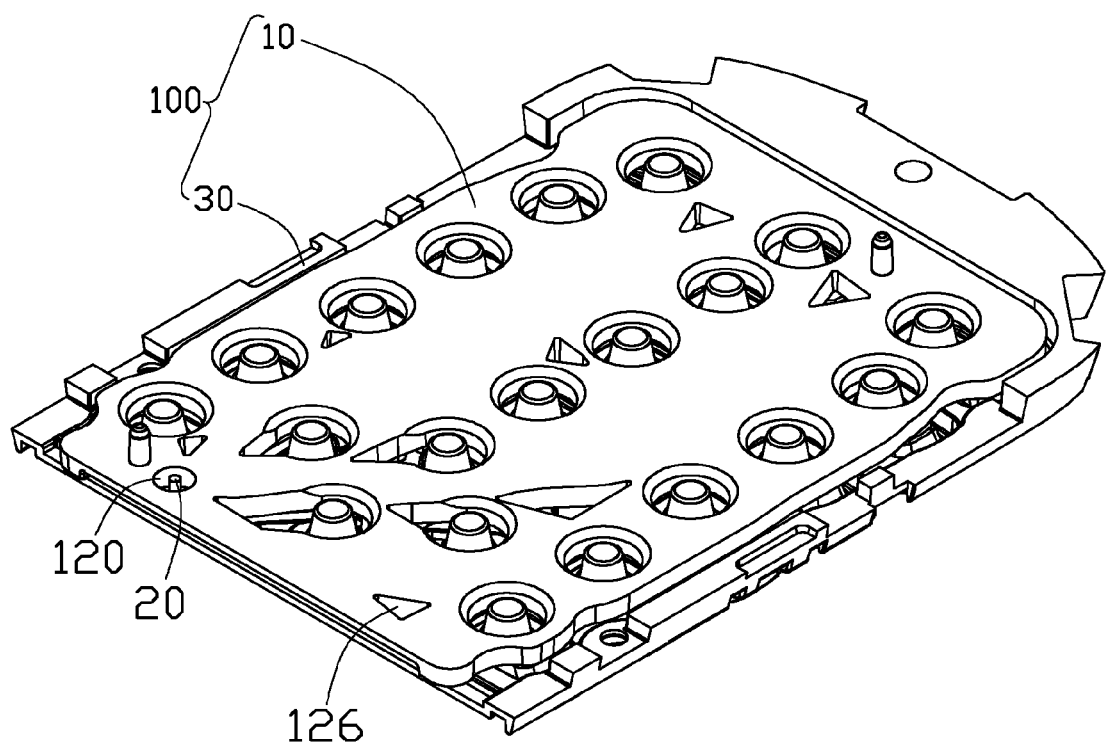
FIG. 1 is an assembled view of a keypad module.

Referring to the drawings in detail, FIG. 1 shows a keypad module 100, in the exemplary embodiment illustrated, includes a light guide plate 10, a keypad 30, and a light source 20. The light guide plate 10 is positioned at one side of the keypad 30, and the light source 20 is positioned at one end of the light guide plate 10.

Figure 2:
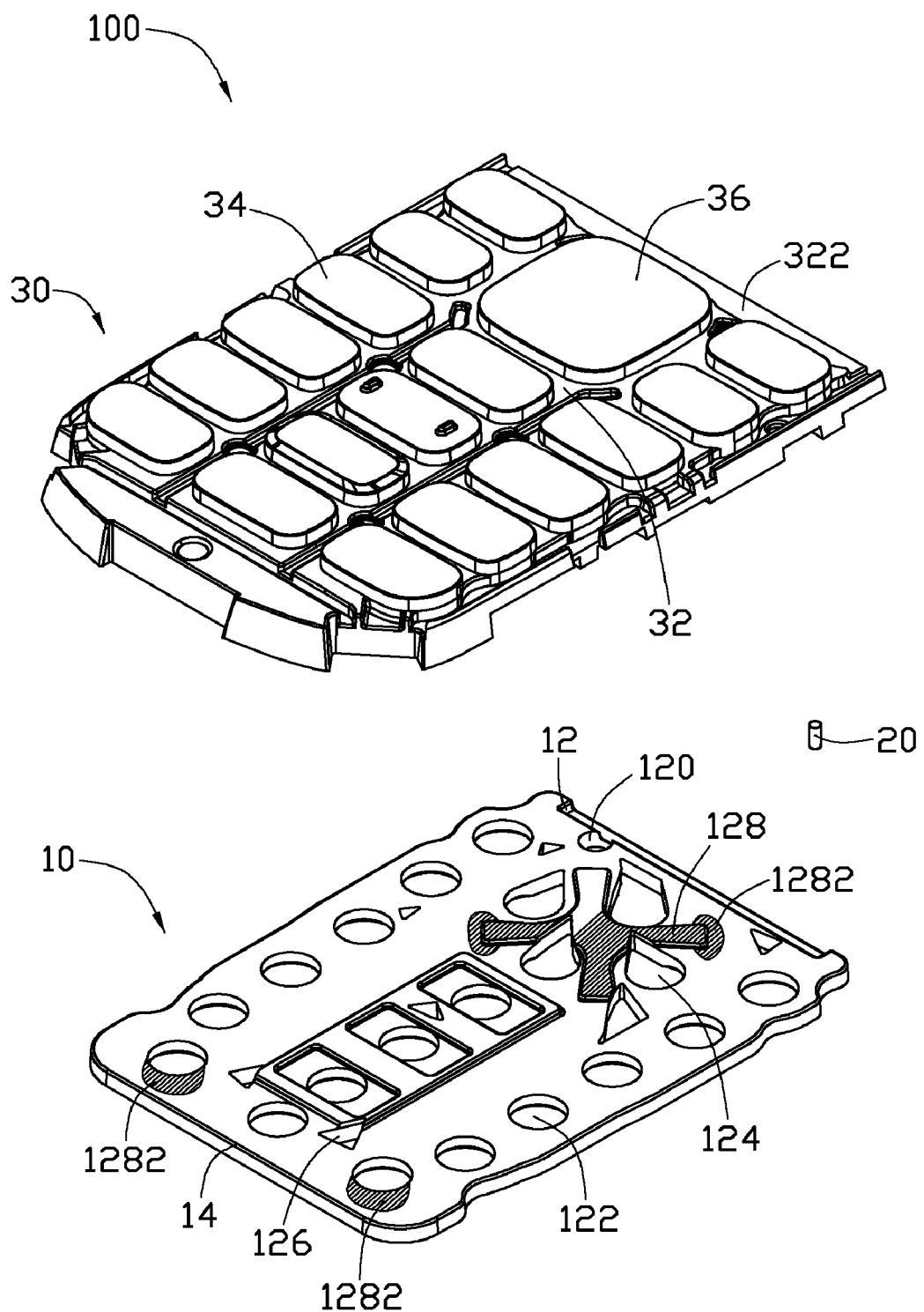
FIG. 2 is an exploded, isometric view of the keypad module shown in FIG. 1.
Figure 3:
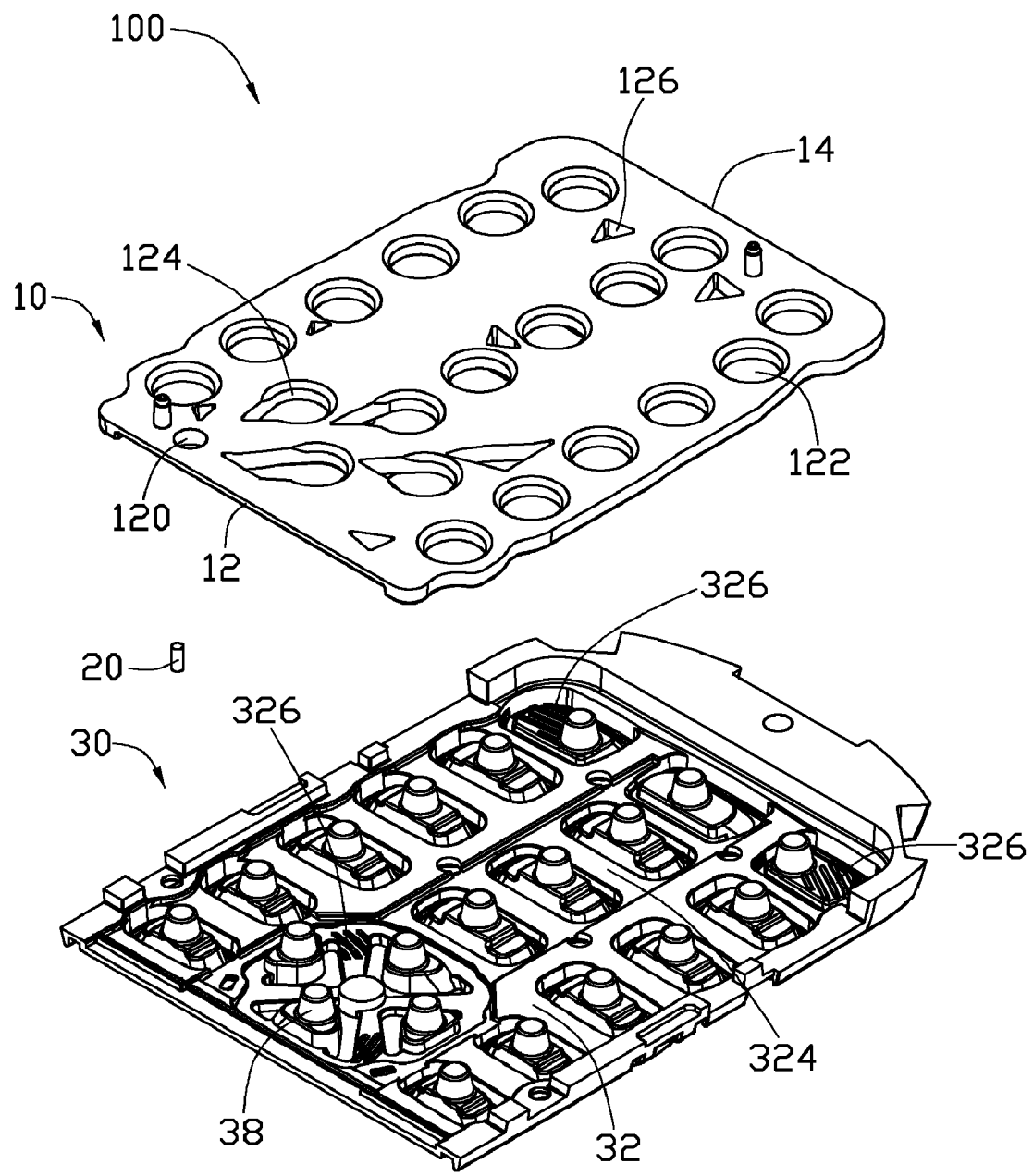
FIG. 3 is similar to FIG. 2, but viewed from another aspect.

Referring to FIGS. 2 and 3, the light guide plate 10 is made of a transparent material such as glass or plastic. The plastic material can be any of acrylic, polyvinylchloride resin (PVC), polycarbonate (PC), polystyrene (PS), polypropylene (PP). The light guide plate 10 includes a first end 12 and a second end 14. The light guide plate 10 defines a receiving hole 120, a plurality of number key holes 122, a plurality of navigation key holes 124 and a plurality of cutouts 126.

The receiving hole 120 is adjacent to the first end 12 for receiving the light source 20. The arrangement of the number key holes 122 corresponds to the number or letter buttons of the keypad 30. A plurality of protrusions 128 are disposed between the navigation key holes 124. Coarse surfaces 1282 are formed on some portions of the protrusions 128 spaced distant from the receiving hole 120. In addition, coarse surfaces 1282 are formed on some of the number key holes 122 in the area of the second end 14. The coarse surfaces 1282 reflect or refract the light rays in this area to guide light of the light source 20 to distant portions of the light guide plate 10 such as the number key holes 122.

Each cutout 126 is triangular, and the sidewalls of each cutout 126 can refract the light beams adjacent to cutout 126 so the light can be transmitted farther. The sidewalls of the cutouts 126 near the receiving hole 120 are designed to have a reflecting angle greater than a critical total internal reflection angle. The sidewalls of the cutouts 126 spaced distant from the receiving holes 120 are designed to have a smaller reflecting angle than those spaced closer to the receiving hole 120. This design may allow the light to transmit uniformly from the first end 12 to the second end 14.

Figure 4:
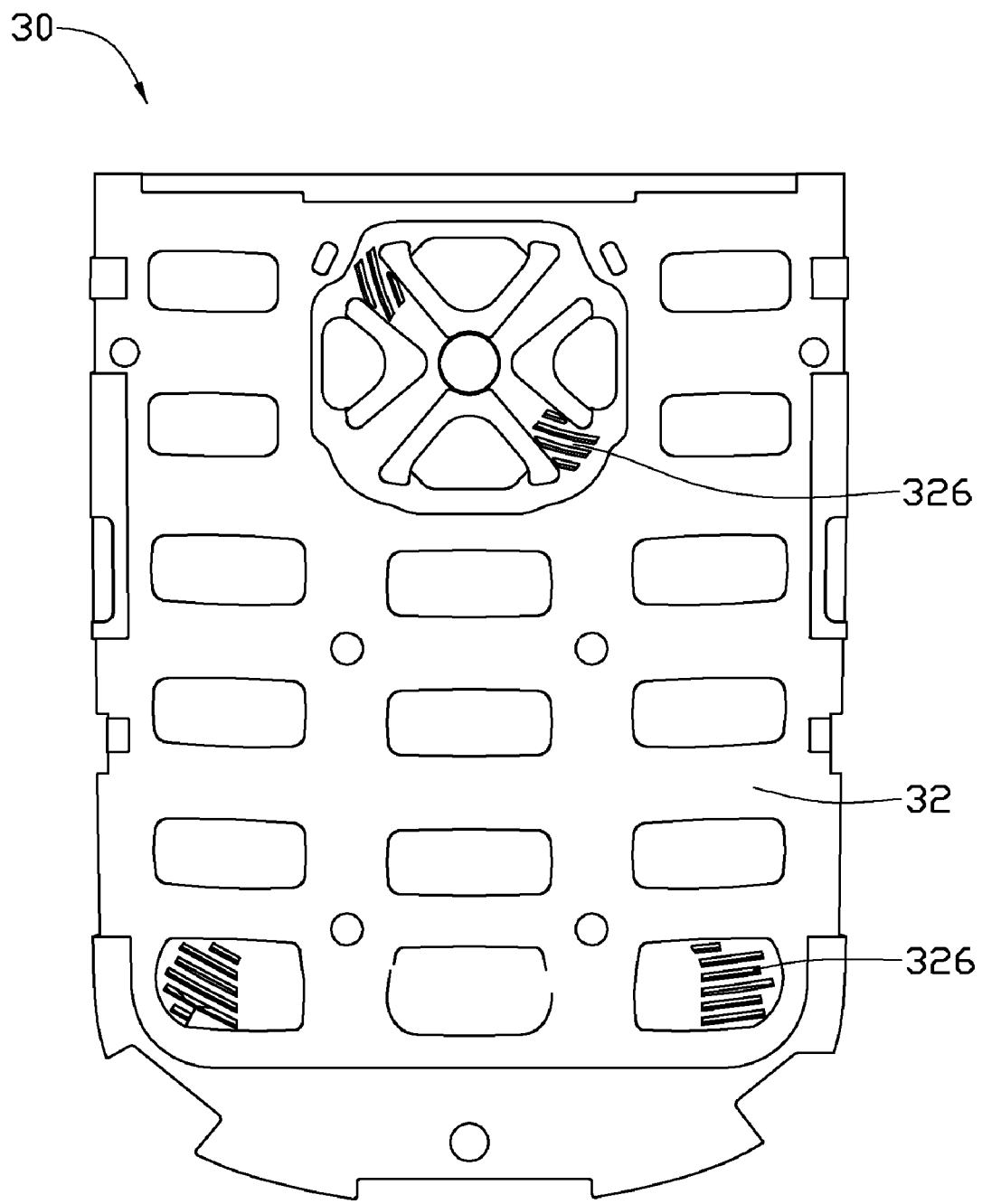
FIG. 4 is a front view of the keypad module in FIG. 1.

Referring to FIGS. 2 to 4, the keypad 30 includes a housing 32, a plurality of number key buttons 34 and a navigation button 36 and a plurality of contacts 38. The housing 32 includes a first surface 322 and a second surface 324. The number key buttons 34 are formed on the first surface 322, and the contacts 38 are formed on the second surface 324. The second surface 324 has a plurality of ribs 326 on an area of the navigation button 36 and two of the number key buttons 34 spaced distant from the navigation button 36. The ribs 326 are made of transparent material, and are integrally formed with the housing 32. Each rib 326 is an arcuate part around the light source 20 for directing the light from the light source 20 to the two number key buttons 34. In addition, the ribs 326 on the navigation button 36 can increase the brightness of the navigation button 36.

In use, the light source 20 emits light in the receiving hole 120. The emitted light is refracted by the sidewalls of the cutouts 126 to illuminate the light guide plate 10. The ribs 326 and the coarse surfaces 1282 guide light of the light source 20 to distant portions of the light guide plate. The light guide plate 10 may design a plurality of ribs and the coarse surfaces according to the need. The keypad module 100 only uses a light guide plate and a light source for illuminating the keypad. The structure of portable electronic device is simple, and the costs are greatly reduced.

It is believed that the present embodiments and their advantages will be understood from the foregoing description, and it will be apparent that different changes may be made thereto without departing from the spirit and scope of the disclosure or sacrificing all of its material advantages, the examples hereinbefore described merely being preferred or exemplary embodiments of the disclosure.

What is claimed is:

1. A keypad module comprising:
   a light source;
   a light guide plate including a plurality of coarse surfaces;
   a keypad forming a plurality of ribs corresponding to the coarse surfaces;
   wherein the light source is positioned in the light guide plate, the coarse surfaces and the ribs guiding light of the light source to distant portions of the light guide plate.

2. The keypad module as claimed in claim 1, wherein the light guide plate includes a first end and a second end, the light guide plate defines a receiving hole, the receiving hole is adjacent to the first end for receiving the light source.

3. The keypad module as claimed in claim 2, wherein the light guide plate defines a plurality of navigation key holes, a plurality of protrusions are disposed between the navigation key holes, the coarse surfaces are formed on some portions of the protrusions.

4. The keypad module as claimed in claim 3, wherein the light guide plate defines a plurality of cutouts, the cutouts near the receiving holes have a reflecting angle greater than a critical total internal reflection angle, and the cutouts far spaced distant from the receiving holes have a smaller reflecting angle.

5. The keypad module as claimed in claim 4, wherein each cutout is triangular.

6. The keypad module as claimed in claim 1, wherein each rib is one arcuate part around the light source for directing the light.

7. A keypad module comprising:
   a light guide plate defining a receiving hole, a plurality of number key holes and a plurality of navigation key holes, coarse surfaces formed on some portions of the navigation key holes spaced distant from the receiving hole and some of the number key holes;

a keypad forming a plurality of ribs corresponding to the coarse surfaces;

a light source received in the receiving hole;

wherein the coarse surfaces and the ribs guiding light of the light source to distant portions of the light guide plate.

8. The keypad module as claimed in claim 7, wherein each rib is one arcuate part around the light source for directing the light.

9. The keypad module as claimed in claim 7, wherein the light guide plate defines a plurality of cutouts, the cutouts near the receiving holes have a reflecting angle greater than a critical total internal reflection angle, the cutouts far spaced distant from the receiving holes have a smaller reflecting angle.

10. The keypad module as claimed in claim 9, wherein each cutout is triangular.

* * * * *